(12) United States Patent
Nishimura

(10) Patent No.: US 6,597,514 B2
(45) Date of Patent: Jul. 22, 2003

(54) WIDE-ANGLE ZOOM LENS

(75) Inventor: Kazuya Nishimura, Hachioji (JP)

(73) Assignee: Olympus Optical Co., Ltd., Tokyo (JP)

( * ) Notice: Subject to any disclaimer, the term of this patent is extended or adjusted under 35 U.S.C. 154(b) by 140 days.

(21) Appl. No.: 09/940,798

(22) Filed: Aug. 29, 2001

(65) Prior Publication Data

US 2002/0048090 A1 Apr. 25, 2002

(30) Foreign Application Priority Data

Aug. 31, 2000 (JP) .................................... 2000-268429

(51) Int. Cl.$^7$ ............................................... G02B 15/14
(52) U.S. Cl. ..................................... 359/692; 359/691
(58) Field of Search ................................... 359/692, 691

(56) References Cited

U.S. PATENT DOCUMENTS

| | | | |
|---|---|---|---|
| 4,936,661 A | 6/1990 | Betensky et al. | 359/692 |
| 5,162,947 A | 11/1992 | Ito | 359/692 |
| 5,164,859 A | 11/1992 | Ito | 359/692 |
| 5,353,163 A | 10/1994 | Shibayama et al. | 359/692 |
| 5,361,167 A * | 11/1994 | Aoki | 359/692 |
| 5,483,380 A | 1/1996 | Nozawa | 359/686 |
| 5,610,767 A | 3/1997 | Ito | 359/692 |
| 5,633,760 A | 5/1997 | Shibayama | 359/692 |
| 5,687,027 A | 11/1997 | Itoh | 359/692 |
| 5,844,725 A | 12/1998 | Itoh | 359/692 |
| 5,900,991 A | 5/1999 | Kang | 359/692 |
| 5,986,821 A | 11/1999 | Yoon | 359/692 |
| 6,008,953 A | 12/1999 | Itoh | 359/692 |

FOREIGN PATENT DOCUMENTS

| | | |
|---|---|---|
| JP | 02-284109 | 11/1990 |
| JP | 04-042114 | 2/1992 |
| JP | 05-119258 | 5/1993 |
| JP | 07-120673 | 5/1995 |
| JP | 07-255337 | 8/1995 |
| JP | 07-234363 | 9/1995 |

* cited by examiner

*Primary Examiner*—Hung Xuan Dang
*Assistant Examiner*—David N. Spector
(74) *Attorney, Agent, or Firm*—Pillsbury Winthrop LLP

(57) ABSTRACT

A wide-angle zoom lens includes a front lens unit with positive refracting power and a rear lens unit with negative refracting power so that spacing between the front lens unit and the rear lens unit is changed to thereby vary the magnification of the zoom lens. In this case, the rear lens unit has a first lens component with positive refracting power and a second lens component with negative refracting power so that an aspherical surface is not included in any lens component, and satisfies the following conditions:

$$2.5 < fT/fW < 5$$

$$0.7 < \tan \omega w < 1.5$$

where $fT$ is the focal length of the entire system of the wide-angle zoom lens at the telephoto position, $fW$ is the focal length of the entire system of the wide-angle zoom lens at the wide-angle position, and $\omega w$ is a half angle of view at the wide-angle position.

8 Claims, 8 Drawing Sheets

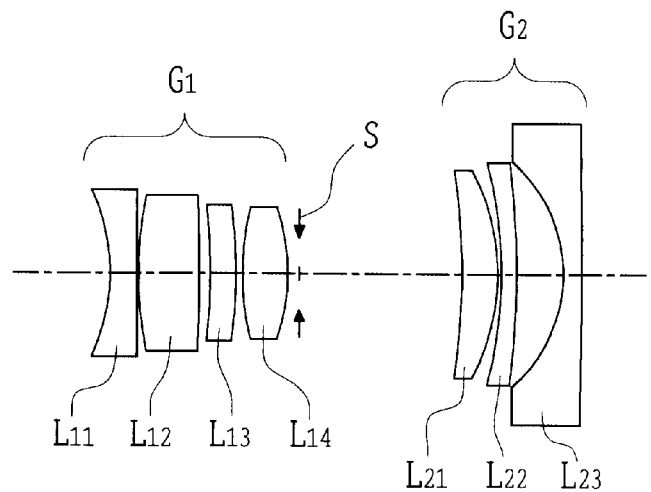
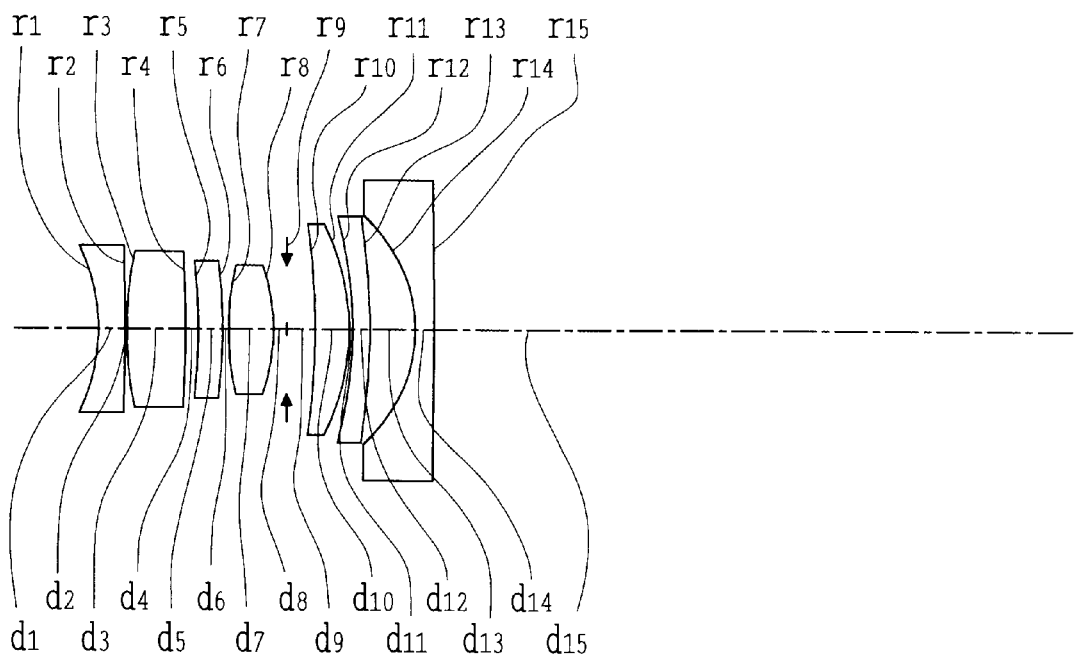

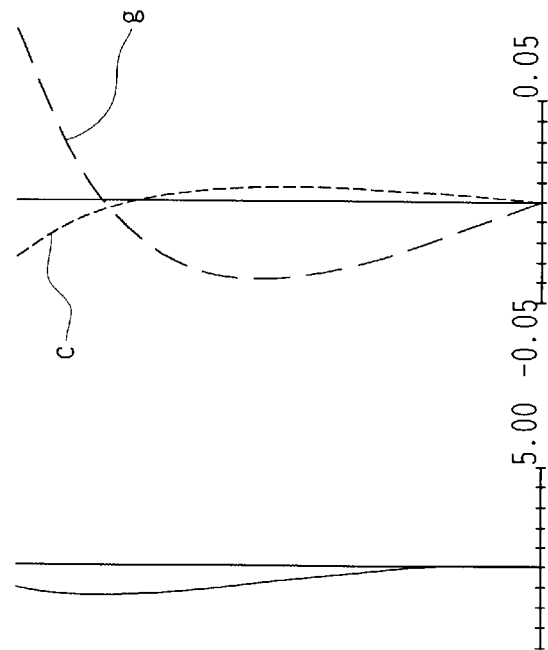

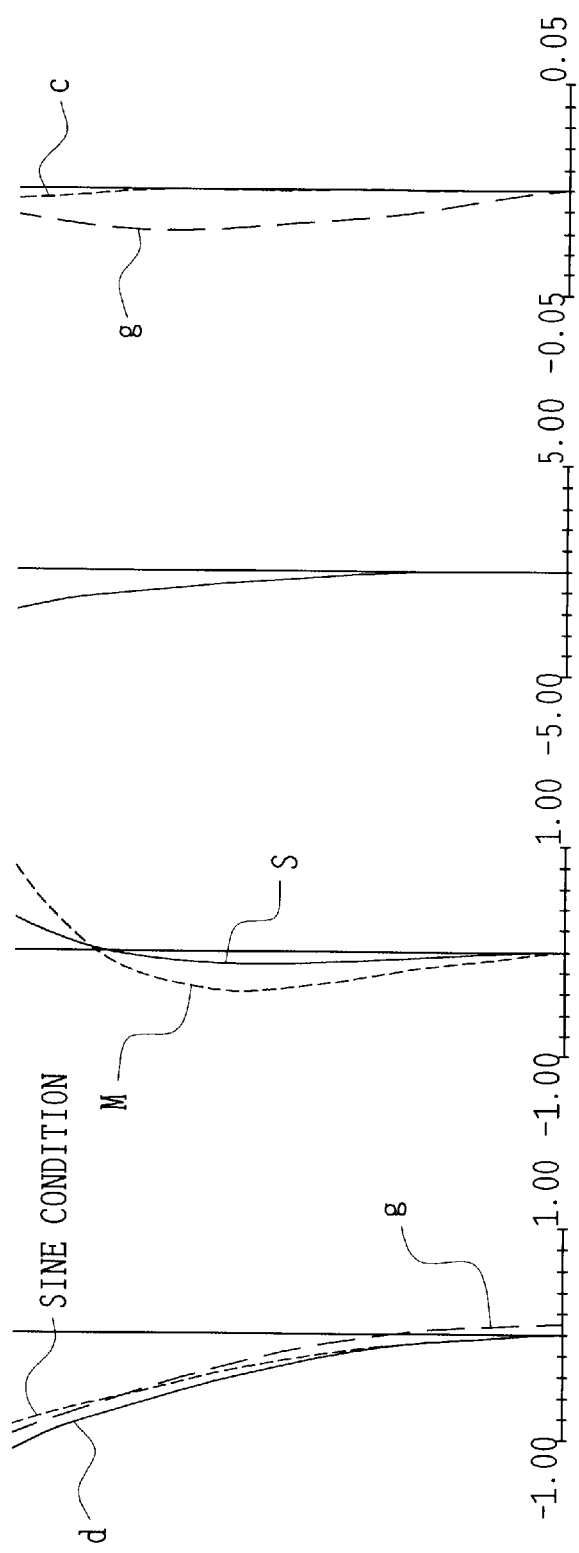

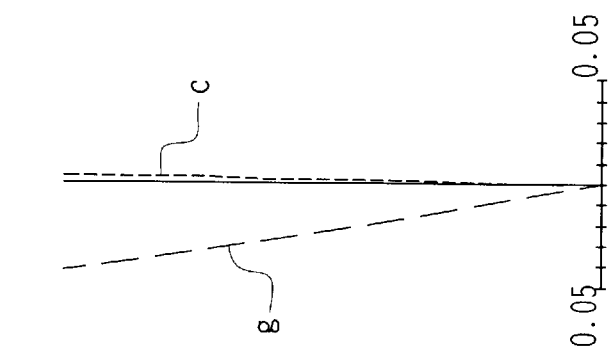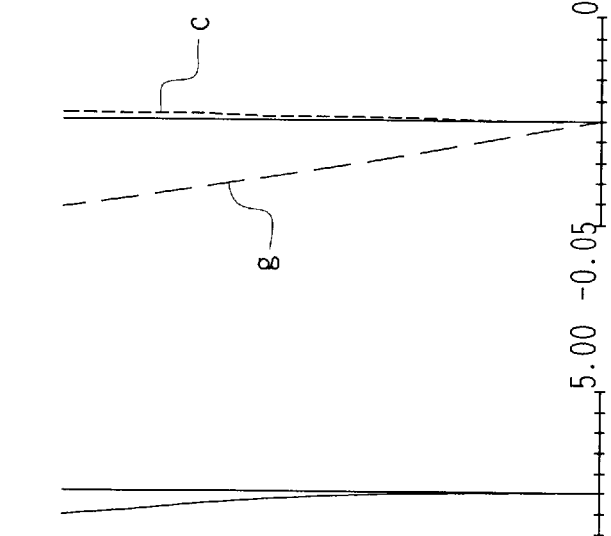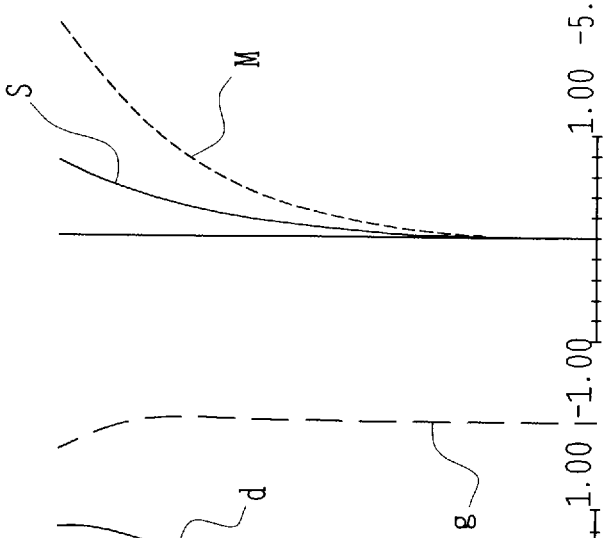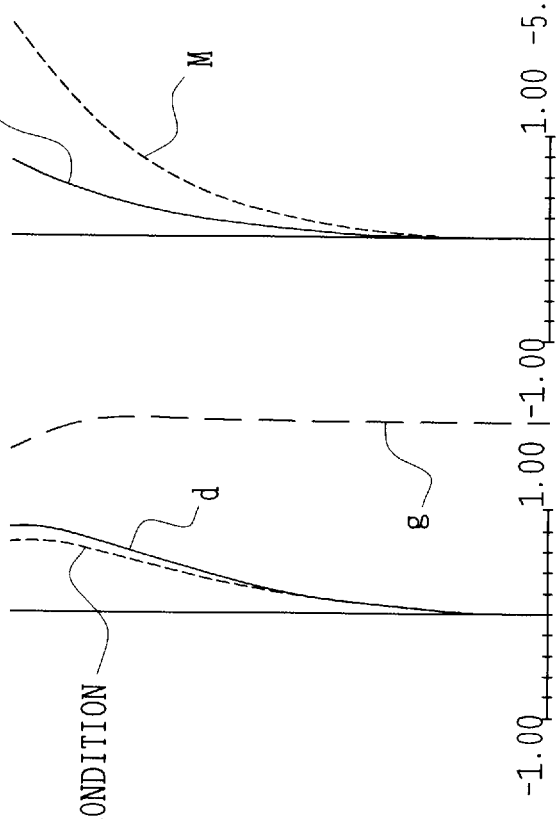

WIDE-ANGLE ZOOM LENS

BACKGROUND OF THE INVENTION

1. Field of the Invention

This invention relates to a wide-angle zoom lens.

2. Description of Related Art

A zoom lens which includes, in order from the object side, a front lens unit with positive refracting power and a rear lens unit with negative refracting power has been often used because the number of lens components is small and its arrangement is simple. Zoom lenses in which an angle of view can be as wide as 70° or more at a wide-angle position are known and disclosed, for example, in U.S. Pat. No. 4,936,661 and Japanese Patent Preliminary Publication Nos. Hei 6-82696, Hei 8-240771, Hei 10-39212, and Hei 10-311947.

The optical system of such a zoom lens includes an aspherical lens in the rear lens unit with negative refracting power, but each lens component of the rear lens unit is large in diameter and thus it is extremely difficult to make the aspherical lens. In particular, since an aspherical lens made of glass requires an advanced technique for the fabrication of the lens, manufacturing cost becomes so high that the aspherical lens cannot be used for an inexpensive product. Furthermore, when an aspherical lens is molded out of resin, it is liable to affect imaging performance, depending on variations in thickness and surface profile due to temperature changes or a way of fixing the lens to a frame member.

Other examples can be cited from Japanese Patent Preliminary Publication Nos. Hei 2-284109, Hei 3-200913, Hei 3-213814, and Hei 7-234363. In each of these examples, a rear lens unit is constructed with three glass lenses, and its fabrication and assembly are favorably performed since an aspherical surface is not used, but the variable magnification ratio of a zoom lens is as low as 2.4 or less. Moreover, since the magnification of each negative lens in the rear lens unit is high at a telephoto position and the shift of a focus position caused by size variations of parts becomes remarkable, it is difficult to increase the focal length at the telephoto position.

SUMMARY OF THE INVENTION

It is, therefore, an object of the present invention to provide a wide-angle zoom lens which includes a front lens unit with positive refracting power and a rear lens unit with negative refracting power so that the rear lens unit has, in order from the object side, a positive lens component and at least one negative lens component, and which is wide in angle of view at a wide-angle position, high in variable magnification ratio, low in cost, and easy in assembly.

In order to achieve the above object, the wide-angle zoom lens according to the present invention includes, in order from the object side, a front lens unit with positive refracting power and a rear lens unit with negative refracting power so that spacing between the front lens unit and the rear lens unit is changed to thereby vary the magnification of the zoom lens. In this case, the rear lens unit has, in order from the object side, a first lens component with positive refracting power and a second lens component with negative refracting power so that an aspherical surface is not included in any lens component, and satisfies the following conditions:

$$2.5 < fT/fW < 5 \quad (1)$$

$$0.7 < \tan \omega w < 1.5 \quad (2)$$

where fT is the focal length of the entire system of the wide-angle zoom lens at the telephoto position, fW is the focal length of the entire system of the wide-angle zoom lens at the wide-angle position, and ωw is a half angle of view at the wide-angle position.

Further, the wide-angle zoom lens according to the present invention includes, in order from the object side, a front lens unit with positive refracting power and a rear lens unit with negative refracting power so that spacing between the front lens unit and the rear lens unit is changed to thereby vary the magnification of the zoom lens. In this case, the rear lens unit has, in order from the object side, a first lens component with positive refracting power, a second lens component with negative refracting power, and a third lens unit with negative refracting power so that an aspherical surface is not included in any lens component, and satisfies Condition (2) and the following conditions:

$$2.1 < ft/fW < 5 \quad (1\text{-}1)$$

$$0.3 < R1/R2 < 0.65 \quad (3)$$

where R1 is the radius of curvature of the most image-side surface of the first lens component and R2 is the radius of curvature of the most object-side surface of the second lens component.

Still further, according to the present invention, the wide-angle zoom lens satisfies the following condition:

$$|f1/f2| < 0.7 \quad (4)$$

where f1 is the focal length of the first lens component and f2 is the focal length of the second lens component.

This and other objects as well as the features and advantages of the present invention will become apparent from the following detailed description of the preferred embodiments when taken in conjunction with the accompanying drawings.

BRIEF DESCRIPTION OF THE DRAWINGS

FIGS. 1A and 1B are sectional views showing lens arrangements, developed along the optical axis, at wide-angle and telephoto positions, respectively, of a first embodiment of the wide-angle zoom lens according to the present invention;

FIGS. 2A, 2B, 2C, and 2D are diagrams showing aberration characteristics at the wide-angle position of the wide-angle zoom lens in the first embodiment;

FIGS. 3A, 3B, 3C, and 3D are diagrams showing aberration characteristics at the middle position of the wide-angle zoom lens in the first embodiment;

FIGS. 4A, 4B, 4C, and 4D are diagrams showing aberration characteristics at the telephoto position of the wide-angle zoom lens in the first embodiment;

DETAILED DESCRIPTION OF THE PREFERRED EMBODIMENTS

Figure 5A:
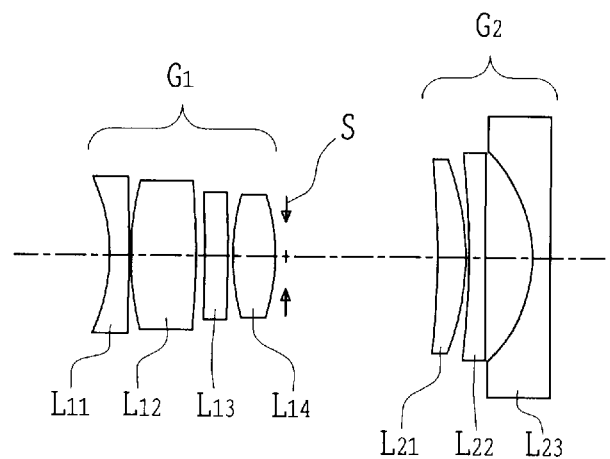
FIGS. 5A and 5B are sectional views showing lens arrangements, developed along the optical axis, at wide-angle and telephoto positions, respectively, of a second embodiment of the wide-angle zoom lens according to the present invention.

In accordance with the embodiments shown in the drawings, the present invention will be described below. Before undertaking the description of the embodiments, the function and effect of the present invention will be explained in detail.

According to the present invention, each lens component of the rear lens unit is constructed with only spherical surfaces or only a spherical surface and a plane surface and thereby can be fabricated by a conventional technical skill. Thus, a lens which has a high magnification, but is low in cost and stable in quality can be obtained. If the upper limit of Condition (1) is exceeded, the balance of astigmatism between the wide-angle position and the telephoto position will not be maintained and imaging performance will be degraded. Beyond the upper limit of Condition (2), at least, either high-order astigmatism or distortion is increased. Below the lower limit of Condition (1) or (2), it becomes possible to moderate fabrication accuracy even when an aspherical lens component is placed in the rear lens unit, and the superiority of cost and quality will be impaired. Within the limit of each condition, a high product value is maintained even though the aspherical lens component is not provided, and at the same time, a low cost and stable quality can be ensured.

Here, a lens component refers to a cemented lens which has no air spacing in the lens and comes in contact with air on the incidence and emergence sides of a light ray, or a single lens.

According to the present invention, in a lens system of a wide angle of view satisfying Condition (2), the refracting powers of the front and rear lens units become strong to increase the lateral magnifications of the second lens component with negative refracting power and the third lens component with negative refracting power, close to an image plane. However, when the lens system satisfies Condition (3) which defines the radii of curvature of the first and second lens components, the lateral magnifications of the second and third lens components are kept to a minimum, and the shift of the focus position caused by variations of parts and assembly can be reduced. Hence, although a high magnification is obtained within the limit of Condition (1), a stable quality of the lens system can be ensured.

Here, the lens component refers to a cemented lens which has no air spacing in the lens and comes in contact with air on the incidence and emergence sides of a light ray, or a single lens.

According to the present invention, by satisfying Condition (4), the lateral magnification of each negative lens component in the rear lens unit is kept to a minimum and the shift of the focus position by a change of the air spacing between the first lens component and the second lens component, caused by size variations of parts can be reduced. Hence, even when the focal length is increased at the telephoto position, the amount of shift of the focus position by the change of the air spacing can be diminished. Beyond the upper limit of Condition (4), the lateral magnification of the negative lens component in the rear lens unit is increased. Moreover, if the power of the first lens component becomes too strong, a negative power required for the entire rear lens unit cannot be ensured, and the amount of movement of the rear lens unit is increased to thereby cause oversizing of the entire system and an unstable operation of a lens barrel mechanism. Instead of satisfying Condition (4), therefore, it is more desirable to satisfying the following condition:

$$0.2<|f1/f2|<0.7 \quad (4\text{-}1)$$

The wide-angle zoom lens according to the present invention includes, in order from the object side, a front lens unit with positive refracting power and a rear lens unit with negative refracting power so that spacing between the front lens unit and the rear lens unit is changed to thereby vary the magnification of the zoom lens. In this case, the rear lens unit has, in order from the object side, a first lens component with positive refracting power, a second lens component with negative refracting power, and a third lens component with negative refracting power, with air spacings between them, and satisfies the following conditions:

$$0.01<|f1/f2|<0.61 \quad (4\text{-}2)$$

By satisfying Condition (4-2), the power of the positive lens component in the rear lens unit has a proper value with respect to the negative power required for the rear lens unit, and the dimension and the lateral magnification of the negative lens component in the rear lens unit become more favorable for assembly and stability. Below the lower limit of Condition (4-2), the positive power of the first lens component becomes relatively strong and the negative power required for the entire rear lens unit cannot be ensured. Consequently, the amount of movement of the rear lens unit is increased to cause oversizing of the entire system and an unstable operation of a lens barrel mechanism. Beyond the upper limit of Condition (4-2), the lateral magnification of each negative lens component in the rear lens unit is increased, and the shift of the focus position becomes remarkable because the air spacing is changed by size variations of parts.

In Condition (4-2), it is rather favorable to set the upper limit to 0.60, preferably 0.57, and it is more favorable to set the lower limit to 0.2. It is also favorable to satisfy Condition (6) which will be described later.

Furthermore, it is desirable to satisfy Condition (1). The rear lens unit may satisfy Condition (2) or (3).

Here, the lens component refers to a cemented lens which has no air spacing in the lens and comes in contact with air on the incidence and emergence sides of a light ray, or a single lens.

The wide-angle zoom lens according to the present invention includes, in order from the object side, a front lens unit with positive refracting power and a rear lens unit with negative refracting power so that spacing between the front lens unit and the rear lens unit is changed to thereby vary the magnification of the zoom lens. In this case, the rear lens unit has, in order from the object side, a first lens component with positive refracting power, a second lens component with negative refracting power, and a third lens component with negative refracting power, with air spacings between them, and satisfies the following conditions:

$$5.21<|f2/f3|<25.0 \quad (5)$$

where f3 is the focal length of the third lens component.

Condition (5) defines a condition for balancing the refracting power between the second lens component and the third lens component in the rear lens unit. If the lower limit of Condition (5) is passed, the negative refracting power of the second lens component becomes strong, the lateral magnifications of the second and third lens components are increased, with the result that the shift of the focus position becomes pronounced because the air spacing is changed by size variations of parts. Beyond the upper limit of Condition (5), the negative refracting power of the third lens component is extremely strengthened, off-axis aberration is liable to be produced.

In Condition (5), it is rather favorable to set the upper limit to 20.0, preferably 17.0, and it is more favorable to set the lower limit to 5.3.

In this construction, it is desirable to satisfy Condition (4). In addition, it is desirable to satisfy Condition (4-1). Whereby, it is possible to improve productivity without making correction for aberration in the rear lens unit and obtaining higher fabrication and assembly accuracy of parts than is necessary.

Here, the lens component refers to a cemented lens which has no air spacing in the lens and comes in contact with air on the incidence and emergence sides of a light ray, or a single lens.

In this case, it is desirable to satisfy Condition (6) which will be described later. In addition, it is desirable to satisfy Condition (1). The rear lens unit may satisfy Condition (2) or (3).

The wide-angle zoom lens according to the present invention further satisfies Condition (4-1) and the following condition:

$$1.6 < f1/fW < 3.5 \qquad (6)$$

By satisfying these conditions, the positive power of the first lens component has a proper value with respect to the negative power required for the rear lens unit, and the dimension and the lateral magnification of each negative lens component in the rear lens unit become more favorable for assembly and stability. Below the lower limit of Condition (4-1) or (6), the positive power of the first lens component becomes relatively strong and the negative power required for the entire rear lens unit cannot be ensured. Consequently, the amount of movement of the rear lens unit is increased to cause not only oversizing of the entire system but also an unstable operation of a lens barrel mechanism. Beyond the upper limit of Condition (4-1), the lateral magnification of the negative lens component in the rear lens unit is increased. Beyond the upper limit of Condition (6), an off-axis ray cannot be bent at the wide-angle position, and thus a ray height is not decreased, resulting in an increase of lens diameter.

The wide-angle zoom lens according to the present invention is designed so that a glass material of any lens component included in the rear lens unit satisfies the following condition:

$$0.01 \times 10^{-5} (1/°\ C.) < \alpha < 2 \times 10^{-5} (1/°\ C.) \qquad (7)$$

where $\alpha$ is an average expansion coefficient per ° C. in the range of normal temperatures of the glass material at $-30°$ C. to $70°$ C.

By using the glass material satisfying Condition (7), the influence of the glass material on a temperature change can be lessened, and fixing of the glass material to a frame member is facilitated. This is effective for assembly and the stability of quality. Specifically, when the glass material is used beyond the upper limit of Condition (7), the degree of expansion of a lens at a high temperature is above the coefficient of linear expansion of the frame member requiring mechanical strength. Thus, since the lens is swelled in the frame by thermal expansion and the surface accuracy of the lens is deteriorated, imaging performance is impaired. In order to prevent this defect, it is necessary to hold the lens to the frame with an elastic member in a state where a lens fitting portion is provided with a gap so that thermal expansion is expected, or to fix the lens with an elastic adhesive. With such a technique, however, it is difficult to prevent decentering of the lens. In the glass material satisfying Condition (7), by determining the dimension to fit the lens to the frame member, even when the lens is fixed to the frame member with high accuracy by a holding ring, caulking, or an adhesive, the surface accuracy of the lens is not impaired by thermal expansion. A glass material such as to exceed the lower limit of Condition (7), on the other hand, does not exist in general.

The embodiments of the present invention will be explained below with reference to the drawings and numerical data.

First Embodiment

The wide-angle zoom lens of this embodiment, as shown in FIGS. 1A and 1B, includes, in order from the object side, a front lens unit $G_1$ with positive refracting power and a rear lens unit $G_2$ with negative refracting power so that spacing between these two lens units $G_1$ and $G_2$ is changed to thereby vary the magnification of the zoom lens. Specifically, when the magnification is changed in the range from the wide-angle position to the telephoto position, the front lens unit $G_1$ and the rear lens unit $G_2$ are moved toward the object side while narrowing the spacing between them. Also, in FIG. 1A, reference symbol S represents a stop.

The front lens unit $G_1$ includes, in order from the object side, a negative lens component $L_{11}$, a positive lens component $L_{12}$, a positive lens component $L_{13}$, and a positive lens component $L_{14}$, each of which is constructed with a single lens. The rear lens unit $G_2$ includes, in order from the object side, a lens component $L_{21}$ with positive refracting power, a lens component $L_{22}$ with negative refracting power, and a lens component $L_{23}$ with negative refracting power, each of which is constructed with a single lens.

As shown in lens data to be described later, the wide-angle zoom lens of the first embodiment is designed so that the angle of view at the wide-angle position is above 70°. A variable magnification ratio is not less than 2.5.

Subsequently, numerical data of optical members constituting the wide-angle zoom lens of the first embodiment are shown below. In these data, $r_1$, $r_2$, . . . denote radii of curvature of surfaces of individual lens components; $d_1$, $d_2$, . . . denote thicknesses of individual lens components or air spacings between them; $n_1$, $n_2$, . . . denote refractive indices of individual lens components at the d line; $v_1$, $v_2$, . . . denote Abbe's numbers of individual lens components; f denotes the focal length of the entire system of the wide-angle zoom lens; bf denotes a back focal distance; $\omega$ denotes a half angle of view; and Fno denotes the F-number of the zoom lens.

Also, when Z is taken as the coordinate in the direction of the optical axis, y is taken as the coordinate normal to the optical axis, K represents a conic constant, and $AC_2$, $AC_4$, $AC_6$, and $AC_8$ represent second, fourth, sixth, and eighth order aspherical coefficients, respectively, the configuration of an aspherical surface is expressed by the following equation:

$$Z=(y^2/r)/[1+\{1-(1+K)\cdot(y/r)^2\}^{1/2}]+AC_2y^2+AC_4y^4+AC_6y^6+AC_8y^8$$

These symbols are also used for the numerical data of other embodiments to be described later.

$r_1 = -17.4457$
$d_1 = 2.34$    $n_1 = 1.83400$    $\nu_1 = 37.16$
$r_2 = -2617.0154$
$d_2 = 0.20$
$r_3 = 35.3601$
$d_3 = 5.30$    $n_3 = 1.51633$    $\nu_3 = 64.14$
$r_4 = -114.6869$
$d_4 = 1.04$
$r_5 = -106.7032$
$d_5 = 2.30$    $n_5 = 1.52542$    $\nu_5 = 55.78$
$r_6 = -41.9563$
$d_6 = 0.50$
$r_7 = 25.7257$
$d_7 = 4.10$    $n_7 = 1.48749$    $\nu_7 = 70.23$
$r_8 = -16.5796$
$d_8 = 1.00$
$r_9 = \infty$ (stop)
$d_9$ (variable)
$r_{10} = -57.2854$
$d_{10} = 3.00$    $n_{10} = 1.51633$    $\nu_{10} = 64.14$
$r_{11} = -20.3704$
$d_{11} = 0.35$
$r_{12} = -34.0460$
$d_{12} = 1.40$    $n_{12} = 1.53172$    $\nu_{12} = 48.84$
$r_{13} = -72.9473$
$d_{13} = 4.10$
$r_{14} = -13.4098$
$d_{14} = 1.72$    $n_{14} = 1.71300$    $\nu_{14} = 53.87$
$r_{15} = -449.2453$
$d_{15} = bf$ Aspherical coefficients
Fifth surface $K = 0$
$AC_2 = 0$    $AC_4 = -8.5128 \times 10^{-5}$    $AC_6 = -4.1599 \times 10^{-7}$
$AC_8 = -2.9008 \times 10^{-9}$

| Zoom data | | | |
|---|---|---|---|
|  | Wide-angle position | Middle position | Telephoto position |
| f | 28.97 | 48.99 | 77.35 |
| d9 | 14.403 | 6.753 | 2.695 |
| bf | 6.015 | 26.980 | 56.677 |
| ω (°) | 37.00 | 24.13 | 15.76 |
| Fno | 5.72 | 7.89 | 9.76 |

Variable magnification ratio: 2.67

FIGS. 2A–2D, 3A–3D, and 4A–4D show aberration curves in the zoom lens of the first embodiment.

Second Embodiment

Figure 5B:
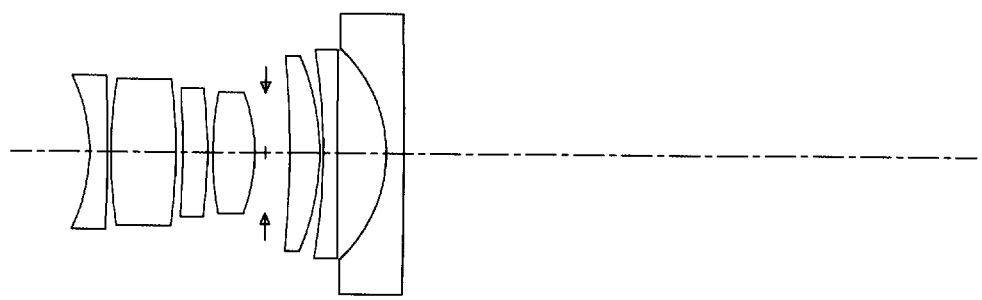

The wide-angle zoom lens of this embodiment, as shown in FIGS. 5A and 5B, includes, in order from the object side, the front lens unit $G_1$ with positive refracting power and the rear lens unit $G_2$ with negative refracting power so that spacing between these two lens units $G_1$ and $G_2$ is changed to thereby vary the magnification of the zoom lens.

The front lens unit $G_1$ includes, in order from the object side, the negative lens component $L_{11}$, the positive lens component $L_{12}$, the positive lens component $L_{13}$, and the positive lens component $L_{14}$, each of which is constructed with a single lens. The rear lens unit $G_2$ includes, in order from the object side, the lens component $L_{21}$ with positive refracting power, the lens component $L_{22}$ with negative refracting power, and the lens component $L_{23}$ with negative refracting power, each of which is constructed with a single lens.

As shown in lens data to be described later, the wide-angle zoom lens of the second embodiment is designed so that the angle of view at the wide-angle position is above 70°. A variable magnification ratio is not less than 2.5.

$r_1 = -17.063$
$d_1 = 1.73$    $n_1 = 1.83400$    $\nu_1 = 37.16$
$r_2 = -274.0156$
$d_2 = 0.29$
$r_3 = 40.4460$
$d_3 = 6.25$    $n_3 = 1.51633$    $\nu_3 = 64.14$
$r_4 = -64.5496$
$d_4 = 0.74$
$r_5 = -210.8264$
$d_5 = 2.30$    $n_5 = 1.52542$    $\nu_5 = 55.78$
$r_6 = -65.4936$
$d_6 = 0.50$
$r_7 = 27.0054$
$d_7 = 4.10$    $n_7 = 1.48749$    $\nu_7 = 70.23$
$r_8 = -16.5386$
$d_8 = 1.00$
$r_9 = \infty$ (stop)
$d_9$ (variable)
$r_{10} = -77.3480$
$d_{10} = 2.80$    $n_{10} = 1.51633$    $\nu_{10} = 64.14$
$r_{11} = -23.8548$
$d_{11} = 0.35$
$r_{12} = -58.7499$
$d_{12} = 1.40$    $n_{12} = 1.53172$    $\nu_{12} = 48.84$
$r_{13} = \infty$
$d_{13} = 4.63$
$r_{14} = -13.8173$
$d_{14} = 1.72$    $n_{14} = 1.71300$    $\nu_{14} = 53.87$
$r_{15} = -467.1398$
$d_{15} = bf$ Aspherical coefficients
Fifth surface $K = 0$
$AC_2 = 0$    $AC_4 = -7.7129 \times 10^{-5}$    $AC_6 = -5.4436 \times 10^{-7}$
$AC_8 = 8.4700 \times 10^{-11}$

| Zoom data | | | |
|---|---|---|---|
|  | Wide-angle position | Middle position | Telephoto position |
| f | 28.97 | 49.72 | 77.22 |
| d9 | 14.170 | 6.380 | 2.505 |
| bf | 5.68 | 26.87 | 54.95 |
| ω (°) | 36.97 | 23.72 | 15.76 |
| Fno | 5.79 | 7.98 | 9.65 |

Variable magnification ratio: 2.66

Third Embodiment

Figure 6A:
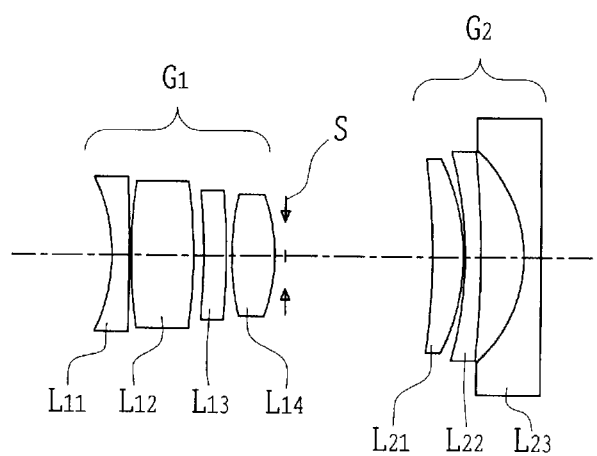
FIGS. 6A and 6B are sectional views showing lens arrangements, developed along the optical axis, at wide-angle and telephoto positions, respectively, of a third embodiment of the wide-angle zoom lens according to the present invention.
Figure 6B:
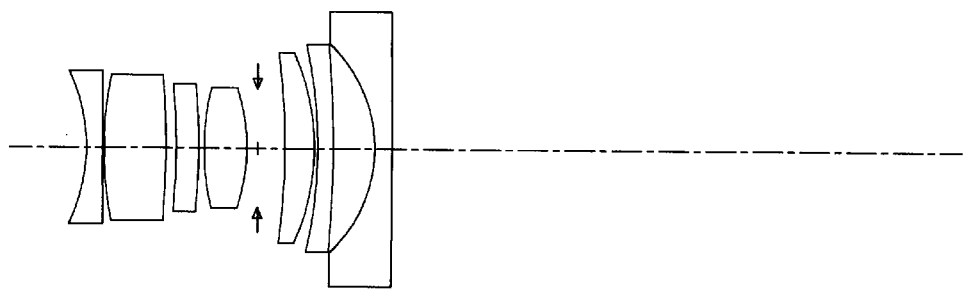

The wide-angle zoom lens of this embodiment, as shown in FIGS. 6A and 6B, includes, in order from the object side, the front lens unit $G_1$ with positive refracting power and the rear lens unit $G_2$ with negative refracting power so that spacing between these two lens units $G_1$ and $G_2$ is changed to thereby vary the magnification of the zoom lens.

The front lens unit $G_1$ includes, in order from the object side, the negative lens component $L_{11}$, the positive lens component $L_{12}$, the positive lens component $L_{13}$, and the positive lens component $L_{14}$, each of which is constructed with a single lens. The rear lens unit $G_2$ includes, in order from the object side, the lens component $L_{21}$ with positive refracting power, the lens component $L_{22}$ with negative refracting power, and the lens component $L_{23}$ with negative refracting power, each of which is constructed with a single lens.

As shown in lens data to be described later, the wide-angle zoom lens of the third embodiment is designed so that the angle of view at the wide-angle position is above 70°. A variable magnification ratio is not less than 2.5.

$r_1 = -17.063$
$d_1 = 1.58$    $n_1 = 1.83400$    $v_1 = 37.16$
$r_2 = -360.0147$
$d_2 = 0.23$
$r_3 = 40.7019$
$d_3 = 6.07$    $n_3 = 1.51633$    $v_3 = 64.14$
$r_4 = -58.4898$
$d_4 = 0.95$
$r_5 = -101.5871$
$d_5 = 2.30$    $n_5 = 1.52542$    $v_5 = 55.78$
$r_6 = -49.3362$
$d_6 = 0.50$
$r_7 = 26.0142$
$d_7 = 4.10$    $n_7 = 1.48749$    $v_7 = 70.23$
$r_8 = -16.7985$
$d_8 = 1.00$
$r_9 = \infty$ (stop)
$d_9$ (variable)
$r_{10} = -66.6079$
$d_{10} = 3.00$    $n_{10} = 1.51633$    $v_{10} = 64.14$
$r_{11} = -21.1920$
$d_{11} = 0.30$
$r_{12} = -35.8397$
$d_{12} = 1.40$    $n_{12} = 1.53172$    $v_{12} = 48.84$
$r_{13} = -97.3173$
$d_{13} = 4.15$
$r_{14} = -13.5576$
$d_{14} = 1.72$    $n_{14} = 1.71300$    $v_{14} = 53.87$
$r_{15} = -465.9980$
$d_{15} = bf$ Aspherical coefficients
Fifth surface $K = 0$
$AC_2 = 0$    $AC_4 = -7.7905 \times 10^{-5}$    $AC_6 = -3.3674 \times 10^{-7}$
$AC_8 = -4.0634 \times 10^{-9}$ $r_1 = -18.1455$
$d_1 = 3.92$    $n_1 = 1.83400$    $v_1 = 37.16$
$r_2 = -611.5295$
$d_2 = 0.20$
$r_3 = 34.2728$
$d_3 = 2.34$    $n_3 = 1.51823$    $v_3 = 58.90$
$r_4 = -164.7035$
$d_4 = 2.79$
$r_5 = -60.9535$
$d_5 = 2.30$    $n_5 = 1.52542$    $v_5 = 55.78$
$r_6 = -34.7902$
$d_6 = 0.40$
$r_7 = 25.3920$
$d_7 = 4.00$    $n_7 = 1.48749$    $v_7 = 70.23$
$r_8 = -17.9084$
$d_8 = 1.00$
$r_9 = \infty$ (stop)
$d_9$ (variable)
$r_{10} = -44.5033$
$d_{10} = 2.63$    $n_{10} = 1.57250$    $v_{10} = 57.74$
$r_{11} = -20.2587$
$d_{11} = 0.22$
$r_{12} = -43.1097$
$d_{12} = 1.35$    $n_{12} = 1.57501$    $v_{12} = 41.50$
$r_{13} = -62.1875$
$d_{13} = 4.02$
$r_{14} = -13.4398$
$d_{14} = 1.72$    $n_{14} = 1.74320$    $v_{14} = 49.34$
$r_{15} = -381.7598$
$d_{15} = bf$ Aspherical coefficients
Fifth surface $K = 0$
$AC_2 = 0$    $AC_4 = -7.980 \times 10^{-5}$    $AC_6 = -1.2711 \times 10^{-7}$
$AC_8 = -5.9235 \times 10^{-9}$ Zoom data

|  | Wide-angle position | Middle position | Telephoto position |
|---|---|---|---|
| f | 28.98 | 50.51 | 77.20 |
| d9 | 14.255 | 6.334 | 2.650 |
| bf | 5.917 | 28.246 | 55.917 |
| ω (°) | 37.05 | 23.45 | 15.78 |
| Fno | 5.79 | 8.10 | 9.64 |

Variable magnification ratio: 2.66

Fourth Embodiment

Figure 7A:
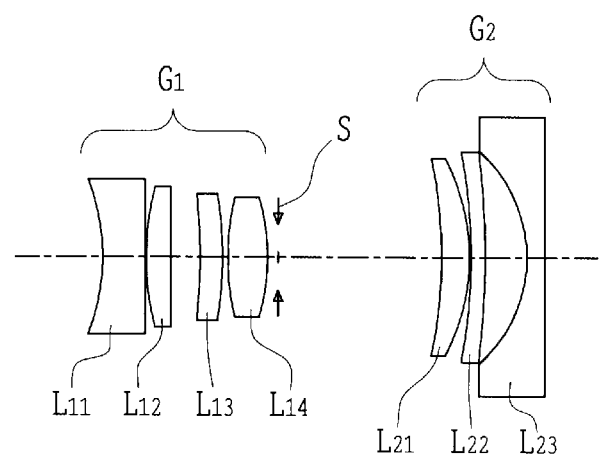
FIGS. 7A and 7B are sectional views showing lens arrangements, developed along the optical axis, at wide-angle and telephoto positions, respectively, of a fourth embodiment of the wide-angle zoom lens according to the present invention.
Figure 7B:
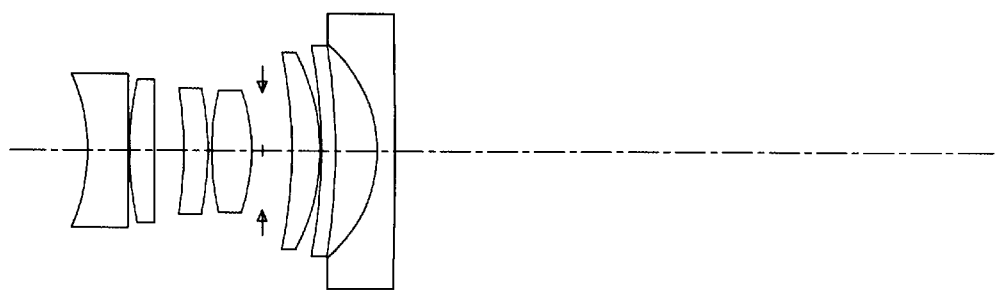

The wide-angle zoom lens of this embodiment, as shown in FIGS. 7A and 7B, includes, in order from the object side, the front lens unit $G_1$ with positive refracting power and the rear lens unit $G_2$ with negative refracting power so that spacing between these two lens units $G_1$ and $G_2$ is changed to thereby vary the magnification of the zoom lens.

The front lens unit $G_1$ includes, in order from the object side, the negative lens component $L_{11}$, the positive lens component $L_{12}$, the positive lens component $L_{13}$, and the positive lens component $L_{14}$, each of which is constructed with a single lens. The rear lens unit $G_2$ includes, in order from the object side, the lens component $L_{21}$ with positive refracting power, the lens component $L_{22}$ with negative refracting power, and the lens component $L_{23}$ with negative refracting power, each of which is constructed with a single lens.

As shown in lens data to be described later, the wide-angle zoom lens of the fourth embodiment is designed so that the angle of view at the wide-angle position is above 70°. A variable magnification ratio is not less than 2.5.

Zoom data

|  | Wide-angle position | Middle position | Telephoto position |
|---|---|---|---|
| f | 28.79 | 49.07 | 77.20 |
| d9 | 15.455 | 7.203 | 2.868 |
| bf | 6.020 | 27.828 | 59.355 |
| ω (°) | 37.12 | 24.23 | 15.85 |
| Fno | 5.77 | 7.97 | 9.76 |

Variable magnification ratio: 2.66

Subsequently, values corresponding to Conditions (1)–(7) in each of the above embodiments are listed in the following table.

|  | Condition (1) | Condition (2) | Condition (3) | Condition (4) | Condition (5) | Condition (6) | Condition (7) |
|---|---|---|---|---|---|---|---|
| 1st embodiment | 2.67 | 0.75 | 0.598 | 0.49 | 6.26 | 2.056 | 0.72 0.82 0.61 |
| 2nd embodiment | 2.66 | 0.75 | 0.406 | 0.59 | 5.52 | 2.265 | 0.72 0.82 0.61 |
| 3rd embodiment | 2.66 | 0.75 | 0.591 | 0.55 | 5.48 | 2.031 | 0.72 0.82 0.61 |
| 4th embodiment | 2.66 | 0.76 | 0.470 | 0.25 | 13.36 | 2.153 | 0.66 0.74 0.54 |

In this table, the values of Condition (7) are indicated in accordance with the lens components arranged in order from the object side.

Figure 8:
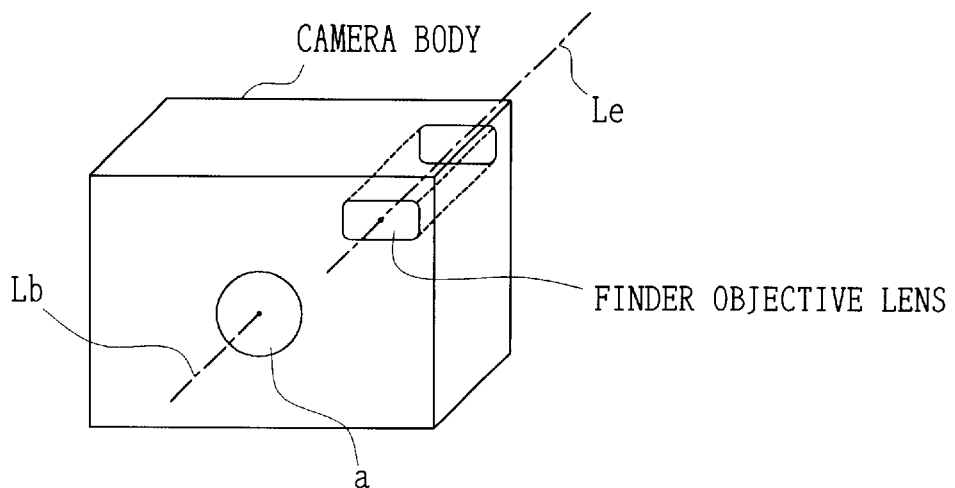
FIG. 8 is a perspective e view showing an example of a photographing apparatus in which the wide-angle zoom lens according to the present invention is used as an objective lens.
Figure 9:
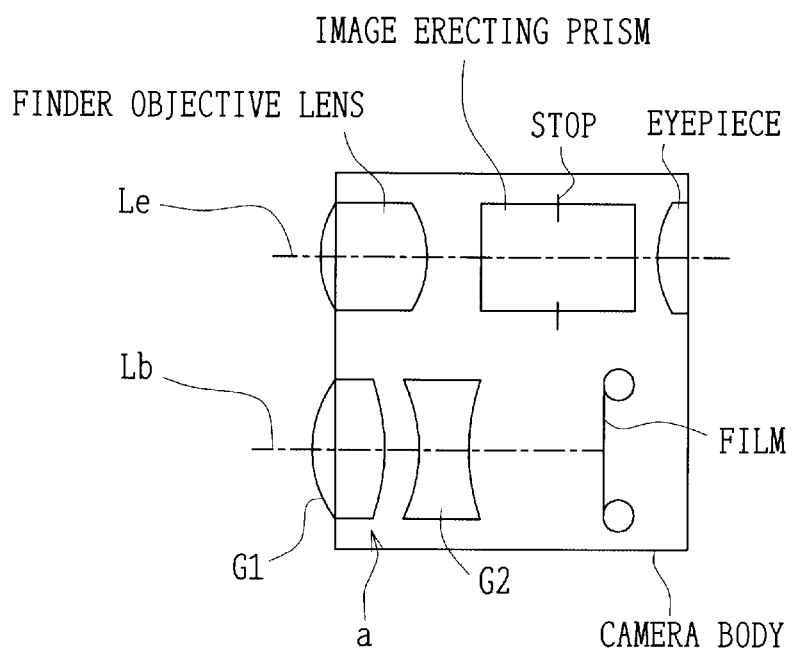
FIG. 9 is a sectional view showing schematically the construction of the photographing apparatus of FIG. 8.

The wide-angle zoom lens of the present invention described above is used as a photographing objective lens a for a compact camera which has a configuration such as that shown in FIGS. 8 and 9. Again, reference symbol $G_1$ denotes the front lens unit with positive refracting power and $G_2$ denotes the rear lens unit with negative refracting power. Also, in these figures, reference symbol Lb represents a photographing optical path and Le represents a finder optical path. The photographing optical path Lb and the finder optical path Le are arranged in parallel. An image of an object is observed through a finder including a finder objective lens, an image erecting prism, a stop, and an eyepiece, and is formed on a film by the photographing objective lens a. The wide-angle zoom lens of the present invention can also be used as a photographing objective lens for a compact electronic camera using an electronic image sensor, such as a CCD, instead of the film. It is desirable that the wide-angle zoom lens of the present invention is designed so that the front lens unit $G_1$ has four single lenses and/or the rear lens unit $G_2$ has three single lenses, in view of cost, performance, and fabrication.

What is claimed is:

1. A wide-angle zoom lens comprising, in order from an object side:

a front lens unit with positive refracting power; and
   a rear lens unit with negative refracting power,
   spacing between said front lens unit and said rear lens unit being changed to thereby vary a magnification of said zoom lens,
   wherein said rear lens unit comprises, in order from said object side, a first lens component with positive refracting power and a second lens component with negative refracting power so that an aspherical surface is excluded from any lens component, and satisfies the following conditions:

$2.5 < fT/fW < 5$ $0.7 < \tan \omega w < 1.5$ where fT is a focal length of an entire system of said wide-angle zoom lens at a telephoto position, fW is a focal length of an entire system of said wide-angle zoom lens at a wide-angle position, and ωw is a half angle of view at said wide-angle position.

2. A wide-angle zoom lens comprising, in order from an object side:

a front lens unit with positive refracting power; and
   a rear lens unit with negative refracting power,
   spacing between said front lens unit and said rear lens unit being changed to thereby vary a magnification of said zoom lens,
   wherein said rear lens unit comprises, in order from said object side, a first lens component with positive refracting power, a second lens component with negative refracting power, and a third lens unit with negative refracting power so that an aspherical surface is excluded from any lens component, and satisfies the following conditions:

$2.1 < fT/fW < 5$ $0.7 < \tan \omega w < 1.5$ $0.3 < R1/R2 < 0.65$ where fT is a focal length of an entire system of said wide-angle zoom lens at a telephoto position, fW is a focal length of an entire system of said wide-angle zoom lens at a wide-angle position, ωw is a half angle of view at said wide-angle position, R1 is a radius of curvature of a most image-side surface of said first lens component, and R2 is a radius of curvature of a most object-side surface of said second lens component.

3. A wide-angle zoom lens according to claim 1 or 2, wherein said rear lens unit satisfies the following condition:

$|f1/f2| < 0.7$ where f1 is a focal length of said first lens component and f2 is a focal length of said second lens component.

4. A wide-angle zoom lens comprising, in order from an object side:

a front lens unit with positive refracting power; and
   a rear lens unit with negative refracting power,
   spacing between said front lens unit and said rear lens unit being changed to thereby vary a magnification of said zoom lens,
   wherein said rear lens unit comprises, in order from said object side, a first lens component with positive refracting power, a second lens component with negative refracting power, and a third lens component with negative refracting power, with air spacings between them, and satisfies the following conditions:

$0.01 < |f1/f2| < 0.61$ where f1 is a focal length of said first lens component and f2 is a focal length of said second lens component.

5. A wide-angle zoom lens comprising, in order from an object side:

a front lens unit with positive refracting power; and
   a rear lens unit with negative refracting power,
   spacing between said front lens unit and said rear lens unit being changed to thereby vary a magnification of said zoom lens,
   wherein said rear lens unit comprises, in order from said object side, a first lens component with positive refracting power, a second lens component with negative refracting power, and a third lens component with negative refracting power, with air spacings between them, and satisfies the following conditions:

$5.21 < |f2/f3| < 25.0$ where f2 is a focal length of said second lens component and f3 is a focal length of said third lens component.

6. A wide-angle zoom lens according to any one of claim 1, 2 or 5, further satisfying the following conditions:

$0.2 < |f1/f2| < 0.7$ $1.6 < f1/fW < 3.5$ where f1 is a focal length of said first lens component, f2 is a focal length of said second lens component, and fW is a focal length of an entire system of said wide-angle zoom lens at said wide-angle position.

7. A wide-angle zoom lens according to any one of claim 1, 2, 4 and 5, wherein a glass material of any lens component included in said rear lens unit satisfies the following condition:

$0.01 \times 10^{-5} (1/°C.) < \alpha < 2 \times 10^{-5} (1/°C.)$ where α is an average expansion coefficient per °C. in a range of normal temperatures of said glass material at −30° C. to 70° C.

8. A photographing apparatus using a wide-angle zoom lens as a photographing objective lens, said wide-angle zoom lens comprising, in order from an object side:

a front lens unit with positive refracting power; and a rear lens unit with negative refracting power, spacing between said front lens unit and said rear lens unit being changed to thereby vary a magnification of said zoom lens, wherein said rear lens unit comprises, in order from said object side, a first lens component with positive refracting power and a second lens component with negative refracting power so that an aspherical surface is excluded from any lens component, and satisfies the following conditions:

$2.5 < fT/fW < 5$ $0.7 < \tan \omega w < 1.5$ where fT is a focal length of an entire system of said wide-angle zoom lens at a telephoto position, fW is a focal length of an entire system of said wide-angle zoom lens at a wide-angle position, and ωw is a half angle of view at said wide-angle position.

* * * * *